US007132845B1

(12) United States Patent
Lamson et al.

(10) Patent No.: US 7,132,845 B1
(45) Date of Patent: Nov. 7, 2006

(54) FA TOOL USING CONDUCTOR MODEL

(75) Inventors: Michael Anthony Lamson, Anna, TX (US); Jay Michael Lawyer, Keller, TX (US); Roger Joseph Stierman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/207,297

(22) Filed: Aug. 19, 2005

(51) Int. Cl.
*G01R 31/26* (2006.01)
*G01R 31/28* (2006.01)
*G06F 17/50* (2006.01)

(52) U.S. Cl. .................. 324/765; 703/14; 714/741
(58) Field of Classification Search ................ 324/642, 324/637, 629, 600, 383, 763, 765; 714/738, 714/739, 741; 716/4; 703/13, 14, 22
See application file for complete search history.

(56) References Cited

U.S. PATENT DOCUMENTS

| 5,349,539 | A | * | 9/1994 | Moriyasu | ..................... 703/15 |
| 5,920,830 | A | * | 7/1999 | Hatfield et al. | ............. 702/119 |
| 6,073,264 | A | * | 6/2000 | Nelson et al. | .............. 714/738 |
| 6,249,891 | B1 | * | 6/2001 | Matsumura et al. | ........ 714/738 |
| 6,487,700 | B1 | * | 11/2002 | Fukushima | ..................... 716/4 |
| 6,653,848 | B1 | * | 11/2003 | Adamian et al. | ........... 324/638 |
| 6,684,169 | B1 | * | 1/2004 | Masella et al. | ............... 702/66 |
| 6,798,212 | B1 | | 9/2004 | Stierman et al. | |
| 6,938,228 | B1 | * | 8/2005 | Zhong | ............................ 716/4 |
| 7,047,174 | B1 | * | 5/2006 | Koh et al. | ..................... 703/14 |
| 2002/0093356 | A1 | * | 7/2002 | Williams et al. | ............ 324/765 |
| 2005/0229121 | A1 | * | 10/2005 | Hildebrant | ...................... 716/4 |
| 2006/0041808 | A1 | * | 2/2006 | Yamamura | .................. 714/738 |

OTHER PUBLICATIONS

"Comparative Time Domain Reflectometry (TDR) Analysis As A Packaging FA Tool", Charles Odegard and Craig Lambert, ISTFA '99, The 25th International Symposium for Testing and Failure Analysis, Nov. 14-18, 1999, Santa Clara, California, (Copyrighted Paper).

* cited by examiner

*Primary Examiner*—Anjan Deb
*Assistant Examiner*—Hoai-An D. Nguyen
(74) *Attorney, Agent, or Firm*—Yinsheng Tung; Wade James Brady, III; Frederick J. Telecky, Jr.

(57) ABSTRACT

In a method and system for testing a test sample (190), a simulation program (130) is used to augment test results provided by a legacy test system (101). The legacy test system (101) includes a measuring device (110) providing a test input (112) to the test sample (190) and receiving a test output (116) from the test sample (190) in response to the test input (112). The simulation program (130) simulates the test sample (190) by predicting a simulated output (134) of the test sample (190) in response to receiving a simulated input (132). A plurality of simulated failures is simulated in the simulation program (130), with each simulated failure generating a corresponding simulated output. The simulation program (130) includes a model (140) for the measuring device (110), the model (140) providing the simulated input (132). A comparator (160) compares the test output (134) with the simulated output (134) to determine a match. The simulated failure providing the match is used to predict a predicted failure location within the test sample (190).

5 Claims, 4 Drawing Sheets

FA TOOL USING CONDUCTOR MODEL

BACKGROUND

The present disclosure relates generally to the testing of integrated circuits (ICs), and more particularly to an improved failure analysis (FA) technique for evaluating interconnect system failures in semiconductor devices and/or packaged assemblies.

Time Domain Reflectometry (TDR) is a well known technique of characterizing an electrical path by sending a pulse of energy such as a voltage step signal into the electrical path and monitoring reflections that are returned or reflected back from an endpoint of the electrical path. The TDR based instrument essentially works on the same principle as radar and uses a stimulus/echo technique to determine the length of the electrical path. The TDR instrument measures the time it takes for the input signal to travel down the electrical path, encounter an end point, and reflect back. The TDR instrument then converts this time to distance and typically displays the information as a waveform and/or distance reading. TDR has traditionally been used to evaluate and test the integrity of all types of interconnect systems such as transmission lines, power lines, telephone, cable TV, optical fibers, and the like.

The TDR concept is presently being used for analyzing and testing interconnections and signal paths on all types of electronic circuitry including semiconductor circuitry, semiconductor devices and integrated circuit (IC) chips. The electronic circuitry being tested, e.g., test samples, may include partially and/or fully assembled semiconductor devices. The use of the TDR technique as a FA tool is described in further detail in the following United States patent and technical paper, which are hereby incorporated herein by reference into this specification: 1) U.S. Pat. No. 6,798,212, entitled "Time Domain Reflectometer Probe Having A Built-In Reference Ground Point", Stierman, et al., and 2) "Comparative Time Domain Reflectometry (TDR) Analysis As A Packaging FA Tool", Charles Odegard and Craig Lambert, ISTFA '99, The 25th International Symposium for Testing and Failure Analysis, 14–18 Nov. 1999, Santa Clara, Calif., (Copyrighted Paper). However, analyzing and interpreting waveforms and/or test results obtained from traditional and/or legacy TDR test systems for locating a point of failure may be difficult, subjective and time consuming since the traditional TDR technique typically lacks the high resolution and may show a broadened reflection pattern around the failure point such as an open or short circuit. Thus, many FA tools used in interconnect testing are often unable to identify an exact position where the failure has occurred.

SUMMARY

Applicants recognize an existing need for an improved method and system for testing and analysis of interconnect failures in semiconductor devices; and improved prediction for locating a point of failure within the test sample, thereby enabling the TDR test to be more responsive and effective in a fast paced semiconductor manufacturing environment; and the advantage of an efficient method and system for interconnect testing, absent the disadvantages found in the prior techniques discussed above.

The foregoing need is addressed by the teachings of the present disclosure, which relates to an improved method and system for testing partially or fully assembled semiconductor devices. According to one embodiment, in a method and system for testing a test sample, a simulation program is used to augment test results provided by a legacy test system. The legacy test system includes a measuring device providing a test input to the test sample and receiving a test output from the test sample in response to the test input. The simulation program simulates the test sample by predicting a simulated output of the test sample in response to receiving a simulated input. A plurality of simulated failures are simulated by the simulation program, with each simulated failure generating a corresponding simulated output. The simulation program includes a model for the measuring device, the model providing the simulated input. A comparator compares the test output with the simulated output to determine a match. The simulated failure providing the match is used to predict a predicted failure location within the test sample.

In one aspect of the disclosure, a method of testing a semiconductor device includes executing a legacy test to test the test sample and obtain a test output from the test sample in response to a test input. To augment the results of the test, a simulation program is executed to simulate the test sample. The simulation program includes a simulated point of failure within the test sample and predicts a simulated output of the test sample in response to a simulated input. A comparison is made between the simulated output and the test output. The simulated point of failure is a predicted point of failure within the test sample when the simulated output substantially matches the test output.

Several advantages are achieved by the method and system for testing semiconductor devices according to the illustrative embodiments presented herein. The embodiments advantageously provide for augmenting the test results obtaining from legacy test systems by improving the resolution to locate one or more failure points of a signal path within the semiconductor device. The improved prediction technique advantageously saves time, cost and material by early detection of defects in the semiconductor manufacturing process. This advantageously enables manufacturers of ICs to detect and replace defective ICs in a timely and cost effective manner, thereby reducing costs and improving product reliability.

DETAILED DESCRIPTION

Figure 1:
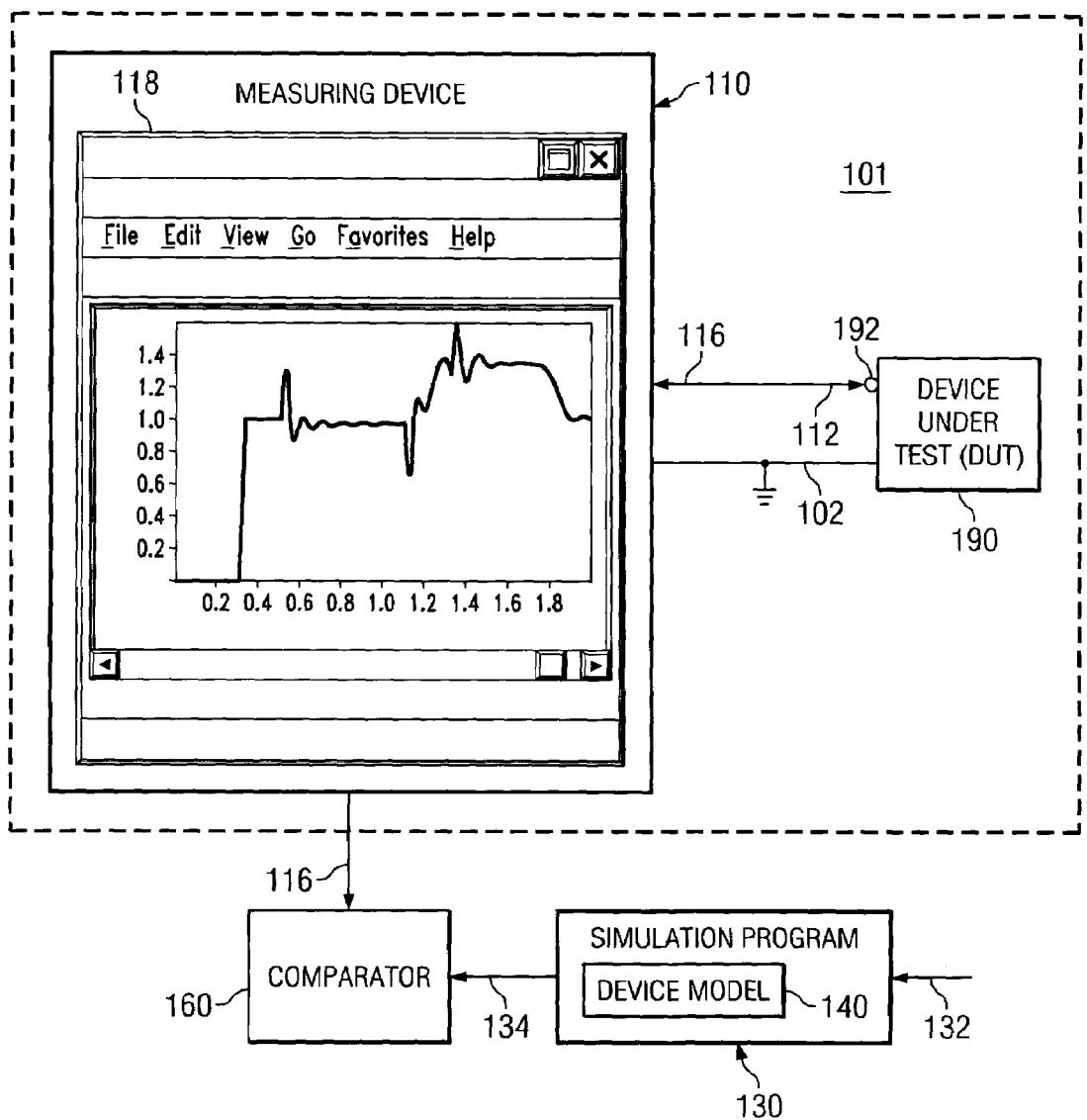
FIG. 1 illustrates a block diagram of a test system, according to an embodiment.

Novel features that may be considered characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

Many traditional TDR measurement based techniques for testing the integrity of interconnections within semiconductor circuits often lack the specificity to locate a point of failure and are therefore less attractive in a fast paced semiconductor manufacturing environment. These problems may be addressed by an improved system and method for interconnect testing within a test sample. In an improved method and system for testing interconnections test results obtained by a legacy test system are augmented by executing a simulation program to simulate the test sample. The simulation program includes a simulated point of failure within the test sample and predicts a simulated output of the test sample in response to a simulated input. A comparison is made between the simulated output and the test output. The simulated point of failure is a predicted point of failure within the test sample when the simulated output substantially matches the test output.

According to one embodiment, in a method and system for testing a test sample, a simulation program is used to augment test results provided by a legacy test system. The legacy test system includes a measuring device providing a test input to the test sample and receiving a test output from the test sample in response to the test input. The simulation program simulates the test sample by predicting a simulated output of the test sample in response to receiving a simulated input. A plurality of simulated failures are simulated by the simulation program, with each simulated failure generating a corresponding simulated output. The simulation program includes a model for the measuring device, the model providing the simulated input. A comparator compares the test output with the simulated output to determine a match. The simulated failure providing the match is used to predict a predicted failure location within the test sample.

The following terminology may be useful in understanding the present disclosure. It is to be understood that the terminology described herein is for the purpose of description and should not be regarded as limiting.

Interconnection—is an electrical coupling between any two electrical components. The interconnection provides a conductive path for an electrical signal to flow between two components. Examples of interconnections may include cables, board traces, connectors, sockets and IC structures such as vias, leads, bonding wires, pins, solder bumps, mounting pads or landings and similar others.

FIG. 1 illustrates a block diagram of a test system 100, according to an embodiment. In the depicted embodiment, the test system 100 includes a measuring device 110 providing a test input 112 to a semiconductor device 190 being tested (also referred to as a device under test 'DUT' 190). The test input 112 is provided to the DUT 190 via a probe (not shown) coupled to a pin 192 of the DUT 190. The pin 192 may also be referred to as a launch port. The DUT 190 and the measuring device 110 share a common ground 102, which provides a return path for the test signals. The DUT 190 provides a test output 116 in response to receiving the test input 112. A typical legacy test system 101 may include the measuring device 110 coupled to the DUT 190.

In a particular embodiment, the measuring device 110 is a Time Domain Reflectometry (TDR) based measuring instrument. The TDR instrument may be functionally viewed as a wide bandwidth sampling oscilloscope (e.g., 1–20 gigahertz) having an internal pulse energy generator, e.g., a voltage step. TDR measurements may be single ended or differential. In this embodiment, the test output 116 is a reflected signal of the voltage step provided as the test input 112. In one embodiment, the test output 116 may be displayed as a waveform or a graphic display 118 on a display screen of the measuring device 110.

In an exemplary non-depicted embodiment, the waveform 118 may be described as an electronic signature of a conducting path within the DUT 190. In addition to or in lieu of displaying the waveform 118, the test output 116 may also be recorded and stored as data in the measuring device 110 and/or be exported. The waveform 118 or electronic signature is analyzed to identify an exact position where a failure or an anomaly may have occurred along the interconnect or the conductive path within the DUT 190. However, as described earlier, the resolution of the waveform 118 may not be sufficient to pin point the exact location.

A failure or an anomaly in the interconnect changes an impedance of the conductive path. Failures or anomalies causing a change in impedance may include oxidation in the interconnect, a narrowing of the conductive path (which may result in an increase in resistance of the conductive path), an open circuit condition in the conductive path (due to presence of air, oxide, metal, or other contents), a short circuit condition in the interconnect (which may be total or resistive), a filament protruding from the interconnect, proximity between the interconnect and another conductive path, or similar other. Additional detail of the test output 116 as a function of the conducting path is described in FIG. 3.

In an exemplary non-depicted embodiment, the DUT 190 may be referred to as a test sample, which may be a partially fabricated semiconductor package or device or a fully fabricated semiconductor package or device. Thus, the DUT 190 may refer to the test sample, the semiconductor device being tested, and/or may refer to a material used in the semiconductor fabrication and packaging of the semiconductor device. The layer of interest, e.g., an interconnection layer, may not reside on the surface, but may be buried within the DUT 190. In a particular embodiment, the test sample, e.g., DUT 190, is one of a microprocessor, a digital signal processor, a radio frequency chip, a memory and a microcontroller.

The test system 100 includes a simulation program 130, which is operable to augment the test results obtained by the legacy test system 101. Use of simulation programs such as the 'simulation program for integrated circuits emphasis' (SPICE) is well known and has been widely used to verify circuit design and/or predict circuit behavior. As described in this disclosure, references to SPICE are also intended to include any general purpose simulation program for modeling integrated circuits, such as any variations in SPICE and/or other SPICE-like programs, including PSPICE, HSPICE, and various proprietary programs. In a particular embodiment, the simulation program 130 is a SPICE program for simulating the DUT 190. That is, the simulation program 130 is a representative model of the real DUT 190, which may be used to predict behavior of the DUT 190 under various input and fault conditions. The simulation program 130 is operable to receive a simulated input 132 and provide a simulated output 134. In one embodiment, the simulated input 132 may be generated internally within the simulation program 130. In an exemplary, non-depicted embodiment, the simulation program 130 may receive and provide a plurality of simulated inputs and outputs.

In a particular embodiment, the simulation program 130 includes a measuring device model 140 for simulating the measuring device 110. In the depicted embodiment, the measuring device model 140 is a portion of the simulation program 130 and may be programmed in SPICE. The measuring device model 140, which is representative of the real measuring device 110, provides the simulated input 132 to the simulation program 130. The simulated input 132 may be varied by adjusting parameters such as pulse rise time and/or other inputs to the measuring device model 140. The simulation program 130 generates the simulated output 134 corresponding to each simulated input 132. Thus, the simulated output 134, which provides an electronic signature for the conductive path, may vary as the simulated input 132 is varied by adjustment of the parameters. Additional detail of modeling the measuring device 110 is described in FIG. 4.

In a particular embodiment, the simulation program 130 may include or may be changed to include simulated failure points and/or anomalies within the DUT 190. In this embodiment, an exact location of the simulated failure point within the DUT 190 and a corresponding electronic signature is known. A selectable failure point in the conductive path may be simulated to occur during one or more processing steps in the manufacturing process of a ball grid array (BGA) package. The electronic signature for the conductive path varies depending on the selected simulated failure point. Thus for a predefined value of the simulated input 132, the simulated output 134 may vary corresponding to a selectable simulated point of failure along the conductive path.

In the depicted embodiment, electronic signatures obtained by the legacy test system and the simulation program 130 are compared to predict a point of failure within the DUT 190. Specifically, the test output 116 is compared to the simulated output 134 by a comparator 160. The comparator 160 determines whether the simulated output 134 substantially matches the test output 116. For example, the comparator 160 may compute a difference between the simulated output 134 and the test output 116 and determine whether the difference is less than or equal to a predefined error. As another example, a correlation index may be computed to determine a match. When the test output 116 substantially matches the simulated output 134, the electronic signatures of the DUT 190 and the simulation program 130 are substantially identical and the simulated point of failure within the DUT 190 is used to pin point a predicted point of failure within the DUT 190. If there is no match between the simulated output 134 and the test output 116, e.g., when the difference exceeds the predefined error or if the correlation index is less than a predefined value, then the simulation program 130 may be modified to substantially match the outputs 134 and 116.

Figure 2A:
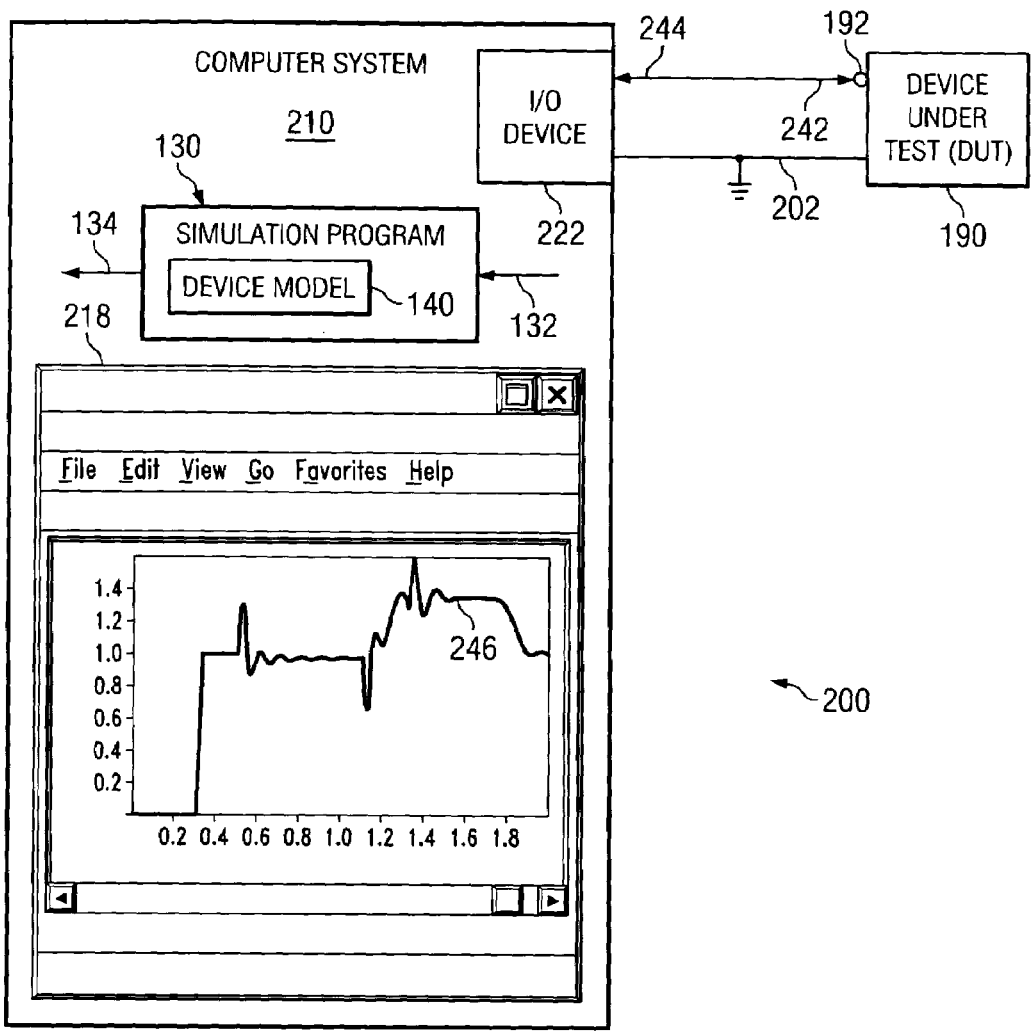
FIG. 2A illustrates a block diagram of an integrated test system, according to an embodiment.

FIG. 2A illustrates a block diagram of an integrated test system 200, according to an embodiment. In the depicted system, the integrated test system 200 includes a computer system 210 coupled to the DUT 190. The computer system 210 includes an input/output (I/O) device 222, which provides a test input 242 to the DUT 190 via port 192. The DUT 190 and the computer system 210 share a common ground 202, which provides a return path for the test signals. The DUT 190 provides a test output 244 in response to receiving the test input 242. Additional details of the computer system 210 are described in FIG. 2B.

In a particular embodiment, the I/O device 222 is the measuring device 110 described in FIG. 1. That is, the I/O device 222 is a Time Domain Reflectometry (TDR) based measuring instrument. In this embodiment, the test output 244 is a reflected signal of the voltage step provided as the test input 242. In one embodiment, the test output 244 may be displayed as a waveform or a graphic display 246 on a display screen 218 of the computer system 210. In one embodiment, the test input 242 and the test output 244 is substantially the same as the test input 112 and the test output 116 respectively.

In the depicted embodiment, the computer system 210 is operable to program/configure, store and execute the simulation program 130 including the measuring device model 140. In an exemplary, non-depicted embodiment, the simulation program 130 is stored in a memory of the computer system 210 and instructions included in the simulation program 130 are executable by a processor included in the computer system 210. The simulated output 134 is displayed on the display screen 218 of the computer system 210.

In an exemplary, non-depicted embodiment, the computer system 210 is operable to perform the functions of the comparator 160. That is, the computer system 210 compares the simulated output 134 and the test output 244 to determine if they match. When the test output 244 substantially matches the simulated output 134, the electronic signatures of the DUT 190 and the simulation program 130 are substantially identical and the simulated point of failure within the DUT 190 is used to pin point a predicted point of failure within the DUT 190. If there is no match between the simulated output 134 and the test output 244, e.g., when the difference exceeds the predefined error, then the simulation program 130 may be modified to substantially match the outputs 134 and 244.

Figure 2B:
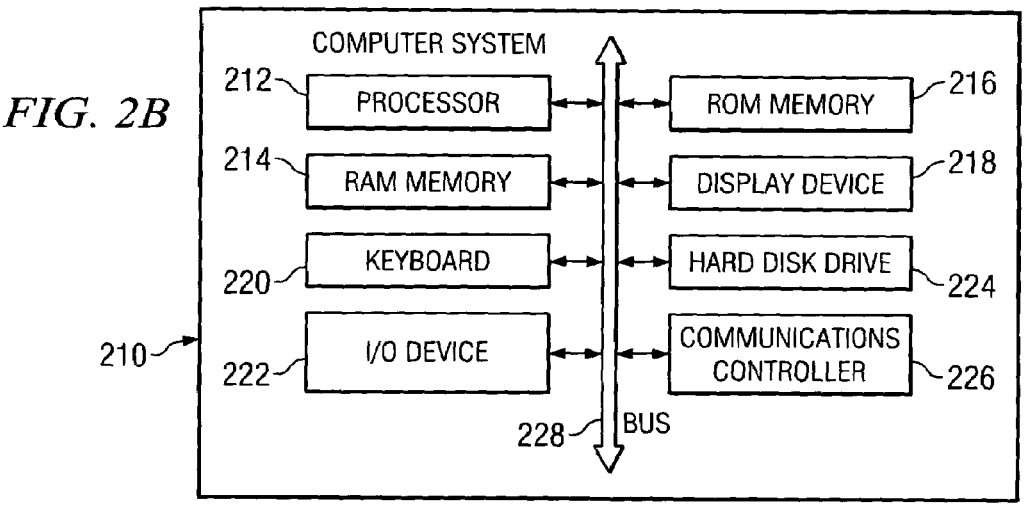
FIG. 2B is a block diagram illustrating additional detail of the computer system of FIG. 2A, according to an embodiment.
Figure 3A:
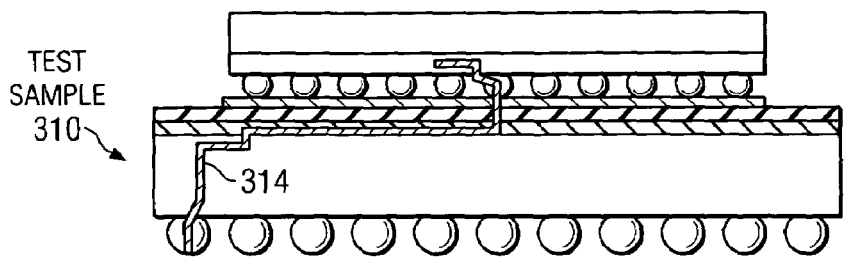
FIG. 3 is an illustrative waveform depicting electronic signatures corresponding to various conducting paths within a test sample, according to an embodiment.
Figure 3B:
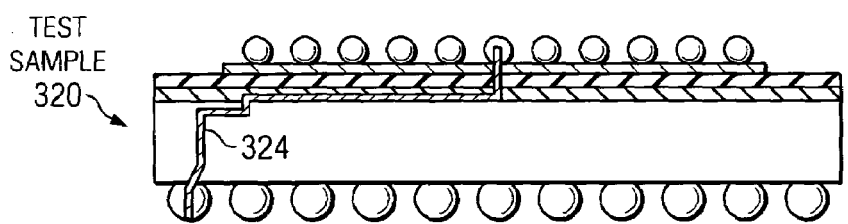
Figure 3C:
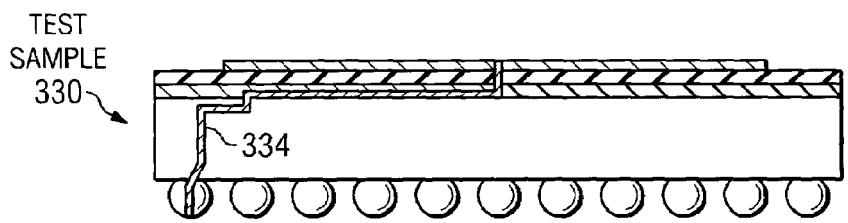
Figure 3D:
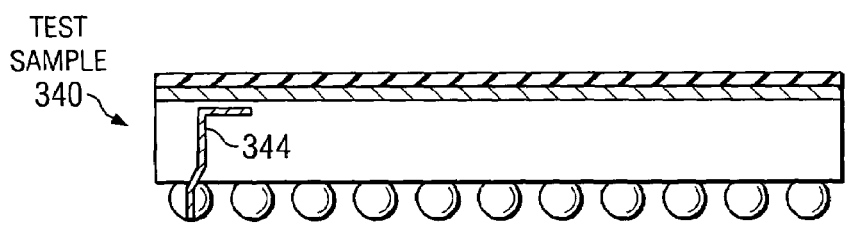
Figure 3E:
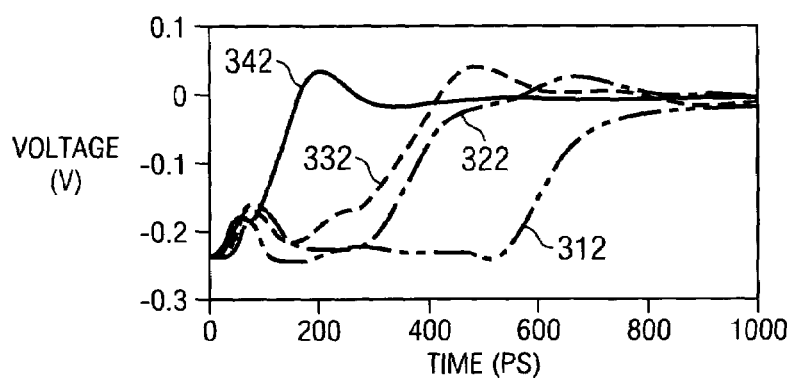

FIG. 2B illustrates a block diagram of the computer system 210 described in FIG. 2A, according to an embodiment. The computer system 210 includes a processor 212, a system random access memory (RAM) 214 (also referred to as main memory), a non-volatile ROM 216 memory, a display device 218, a keyboard 220 and an I/O device 222 for providing TDR measurements. It should be understood that the term "computer system" is intended to encompass any device having a processor that executes instructions from a memory medium.

The computer system 210 is shown to include a hard disk drive 224 connected to the processor 212 although some embodiments may not include the hard disk drive 224. The processor 212 communicates with the system components via a bus 228, which may include data, address and control lines. In one embodiment, the computer system 210 may include multiple instances of the bus 228. A communications controller 226, such as a network interface card, may be connected to the bus 228 to enable information exchange between the computer system 210 and other devices (not shown).

The processor 212 is operable to execute the computing instructions and/or operations of the computer system 210. The memory medium, e.g., RAM 214, preferably stores instructions (also known as a "software program") for implementing various embodiments of a method in accordance with the present disclosure. In various embodiments the instructions and/or software programs such as the simulation program 130 may be implemented in various ways, including procedure-based techniques, component-based techniques, and/or object-oriented techniques, among others. Specific examples include assembler, C, XML, C++ objects, Java and Microsoft Foundation Classes (MFC).

FIG. 3 is an illustrative waveform depicting electronic signatures corresponding to various conducting paths within the DUT 190, according to an embodiment. In the depicted embodiment, four waveforms or electronic signatures 312, 322, 332 and 342 are illustrated corresponding to four conducting paths 314, 324, 334 and 344 within the four test samples 310, 320, 330 and 340. The four test samples 310, 320, 330 and 340 illustrate various stages of fabrication of the DUT 190 ranging from BGA substrate with removed trace line 340 to a fully assembled BGA package complete with die 310. A length of the conductive path may be predicted based on time measurements computed from the waveforms 312, 322, 332 and 342.

The input signal 112 communicated through the conducting path has a known speed. Hence, distance along the conducting path may be described in terms of time. For example, seventeen picoseconds may indicate one hundred microns of distance in the conducting path. Similarly, wavelength of an electrical signal may be described in terms of time. For example, an electrical signal for examining an IC package may have a wavelength of approximately thirty-two picoseconds. Such an electrical signal may provide a resolution of approximately seventeen picoseconds. Since die-level structures are generally smaller than IC package-level structures, an electrical signal having a shorter wavelength (resulting in a faster pulse and higher rise time) may be used to analyze components of a die.

Figure 4:
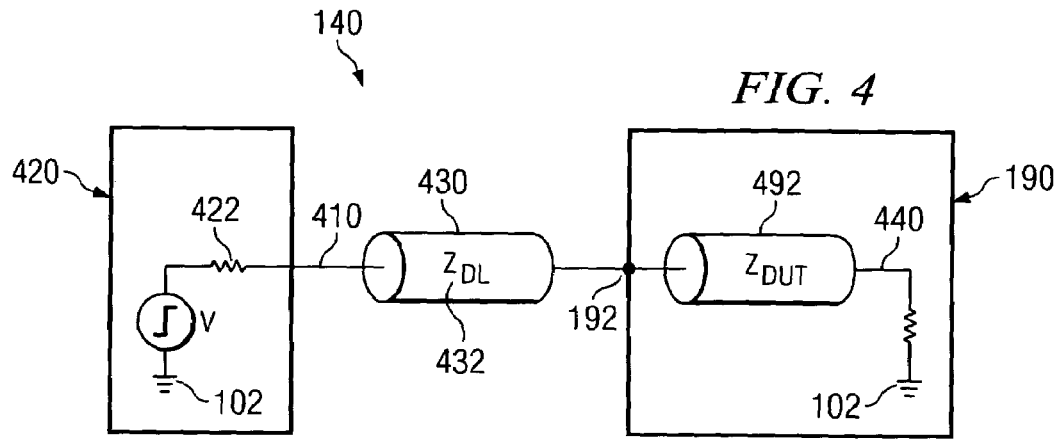
FIG. 4 is an illustrative circuit diagram to model a measuring device of FIG. 1, according to an embodiment.

FIG. 4 is an illustrative circuit diagram to model the measuring device 110 described in FIG. 1, according to an embodiment. In the depicted embodiment, the measuring device model 140 includes passive devices such as a resistor, a capacitor and an inductor, and includes independent sources such as voltage, current and pulse. In developing a measuring device model 140, a signal path 410 for the test input 112 includes a signal source 420 (substantially the same as the measuring device 110), a delay line 430, the launch port 192 and interconnect traces 440 (such as conducting paths 314, 324, 334 and 344) located within the DUT 190. The signal source 420 and the DUT 190 are coupled to a predefined voltage reference such as the ground 102. Equivalent source resistance $R_S$ 422 is typically 50 ohms. Impedance of the DUT 190 is $Z_{DUT}$ 492. Impedance $Z_{DL}$ 432 of the delay line 430 and load $Z_{DUT}$ 492 may be selected to match that of the source to obtain improved electronic signatures.

Figure 5:
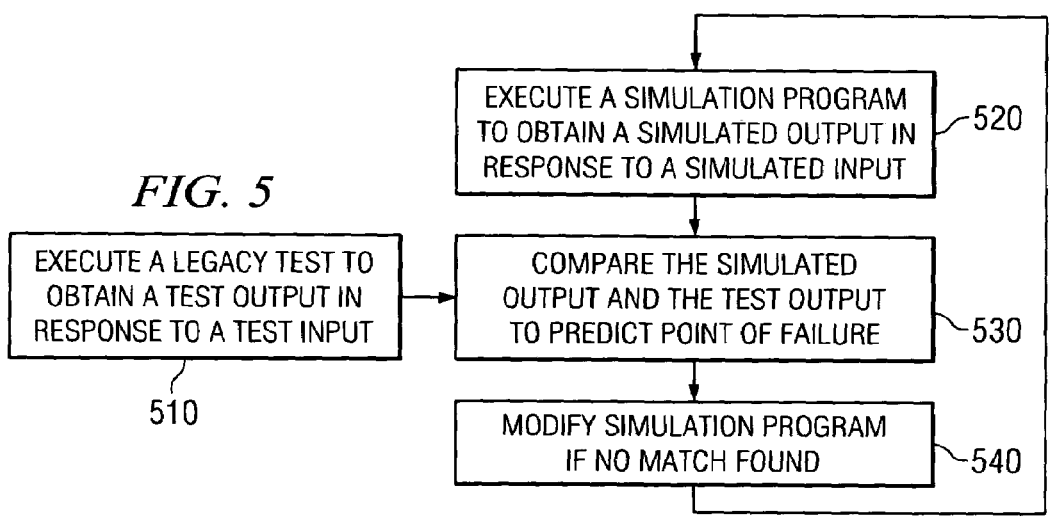
FIG. 5 is a flow chart illustrating a method of testing a test sample, according to an embodiment.

FIG. 5 is a flow chart illustrating a method of testing a test sample, according to an embodiment. At step 510, a legacy test is executed to obtain a test output in response to a test input. In one embodiment, the test sample is the DUT 190, the test output is the test output 116 and the test input is the test input 112. At step 520, which is performed in parallel with step 510, a simulation program is executed to augment the results of the legacy test. In one embodiment, the simulation program is the simulation program 130, which includes a simulated point of failure within the test sample. The simulation program predicts a simulated output in response to a simulated input. In one embodiment, the simulated output is the simulated output 134 and the simulated input is the simulated input 132. In step 530, a comparison is made between the simulated output and the test output to predict the point of failure. The simulated point of failure is a predicted point of failure within the test sample when the simulated output substantially matches the test output.

Various steps described above may be added, omitted, combined, altered, or performed in different orders. For example, an additional step 540 may be added to modify the simulation program and repeat step 520 if no match is found in step 530. As another example, step 510 and step 520 may be performed in a sequential manner rather than in parallel.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, although the disclosure is described in the context of testing a semiconductor device, this disclosure is not limited to use with semiconductor devices; rather, it envisions use of a partially fabricated test sample. As another example, although the disclosure is described in the context of using a SPICE program, the disclosure is equally applicable to various other simulation programs.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A test system for testing a test sample, the system comprising:
   a simulation program to simulate the test sample, wherein the simulation program predicts a simulated output of the test sample in response to receiving a simulated input;
   a measuring device model included in the simulation program to provide the simulated input, wherein the measuring device model simulates a measuring device coupled to the test sample;
   a test output provided by the test sample in response to a test input received from the measuring device; and
   a comparator to compare the test output with the simulated output;
   wherein the simulation program is modifiable to substantially match the simulated output with the test output, and
   is modifiable by changing a simulated point of failure along a signal path of the test input, wherein modifying the simulation program results in modifying the simulated output provided in response to receiving the simulated input.

2. The test system of claim 1, wherein the simulated point of failure is used to predict location of a predicted point of failure within the test sample.

3. The test system of claim 1, wherein the signal path includes a signal source, a delay line, a launch port and interconnect traces, the interconnected traces being located within the test sample.

4. A test system for testing a test sample, the system comprising:

a simulation program to simulate the test sample, wherein the simulation program predicts a simulated output of the test sample in response to receiving a simulated input; and a measuring device model included in the simulation program to provide the simulated input, wherein the measuring device model simulates a measuring device coupled to the test sample;

wherein the measuring device is a time domain reflectometer (TDR), wherein the TDR is operable to provide a pulse of energy as the test input and monitor a reflection that is reflected back as the test output; and wherein the measuring device model simulates the TDR, wherein the measuring device model includes passive devices.

5. The test system of claim 4, wherein the passive devices include a delay line having predefined impedance, a launch port and interconnect traces.

* * * * *